Figure 1:
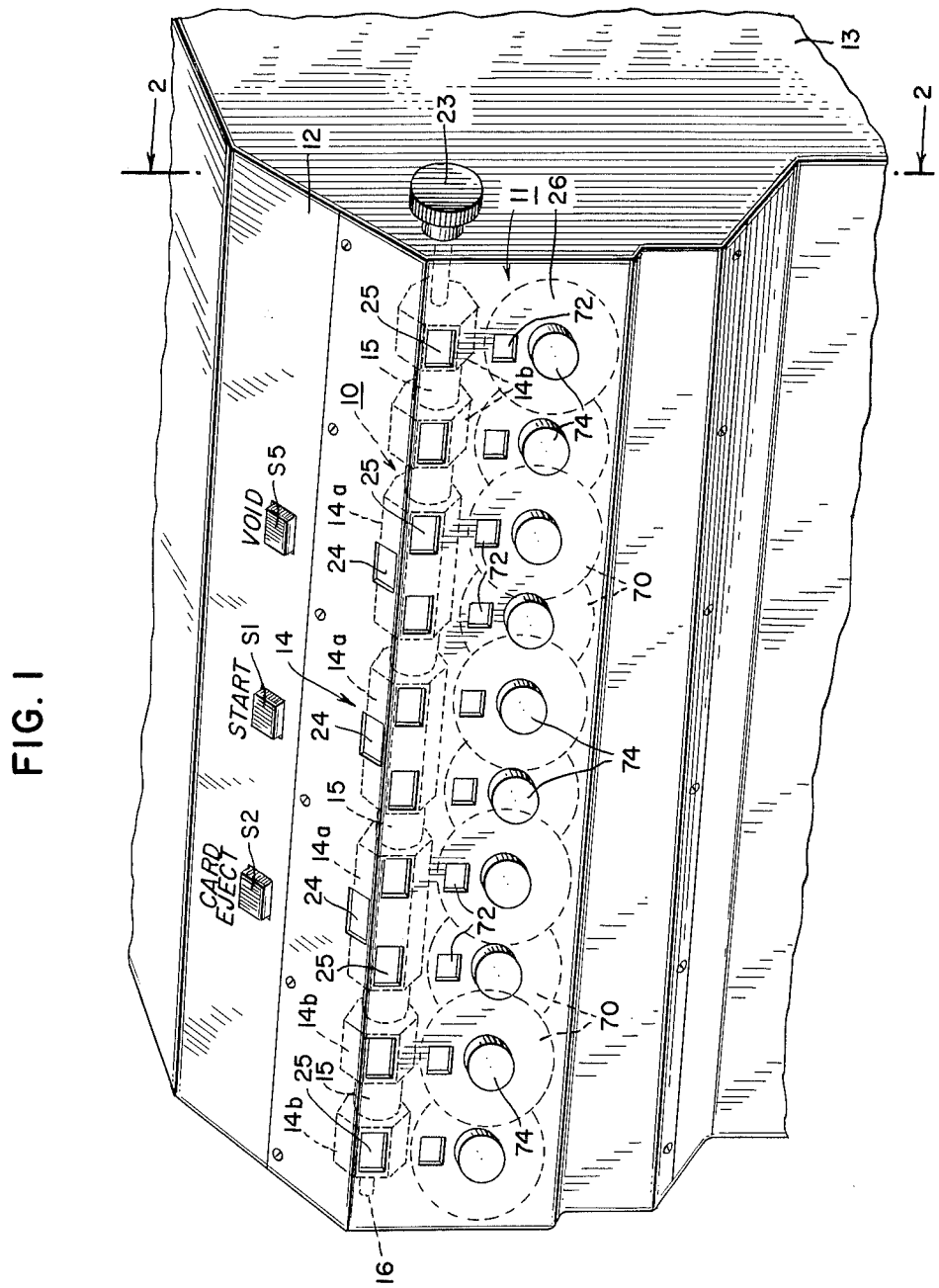

Jan. 4, 1966 E. O. BLODGETT 3,227,847
MULTIPLE SWITCHING ELECTRICAL CONTROL DEVICE
Filed Jan. 30, 1963 4 Sheets-Sheet 1

INVENTOR.
EDWIN O. BLODGETT
BY
John A. Harvey
ATTORNEY

Jan. 4, 1966  E. O. BLODGETT  3,227,847
MULTIPLE SWITCHING ELECTRICAL CONTROL DEVICE
Filed Jan. 30, 1963  4 Sheets-Sheet 2

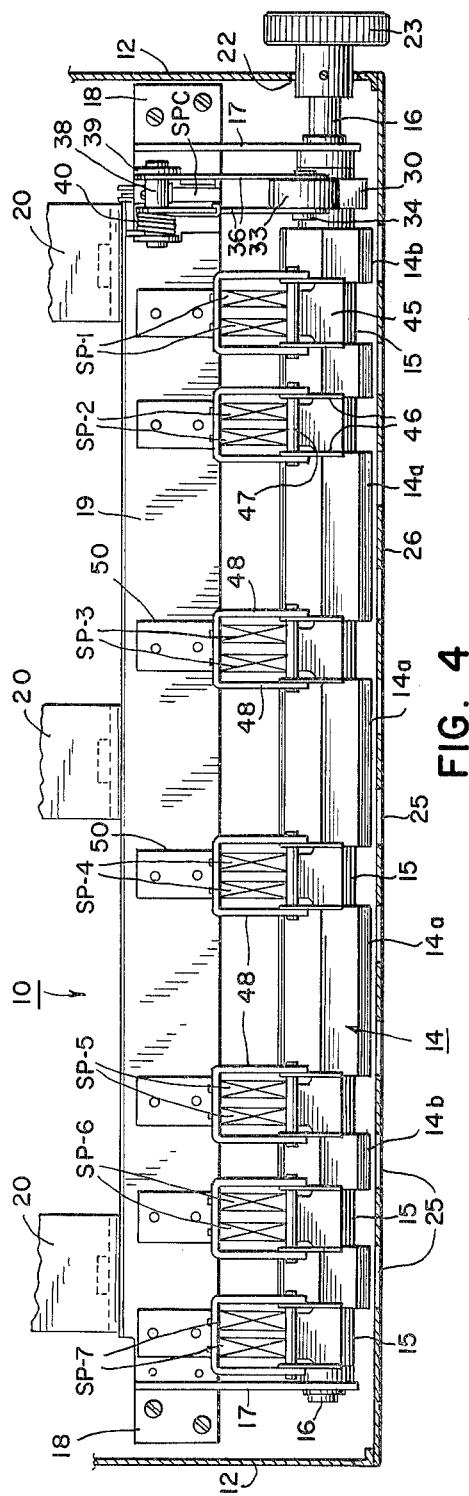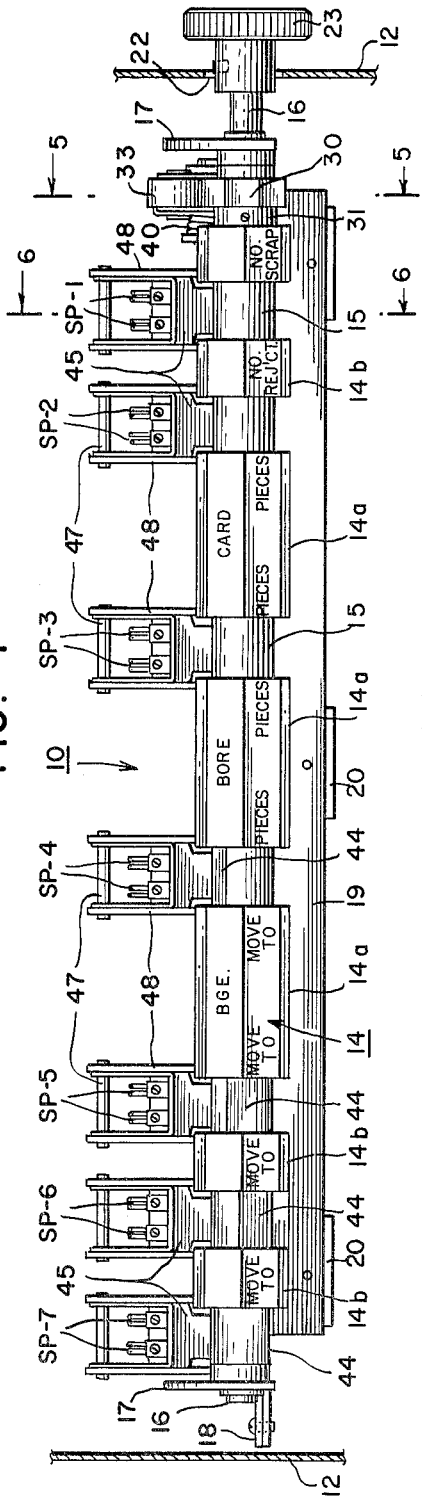

Jan. 4, 1966     E. O. BLODGETT     3,227,847

MULTIPLE SWITCHING ELECTRICAL CONTROL DEVICE

Filed Jan. 30, 1963     4 Sheets-Sheet 4

United States Patent Office 3,227,847
Patented Jan. 4, 1966

3,227,847
MULTIPLE SWITCHING ELECTRICAL
CONTROL DEVICE
Edwin O. Blodgett, Rochester, N.Y., assignor, by mesne assignments, to Friden, Inc., San Leandro, Calif., a corporation of Delaware
Filed Jan. 30, 1963, Ser. No. 254,992
6 Claims. (Cl. 200—153)

The present invention relates to electrical circuit control devices and, particularly, to control devices of a type which may be manually set to any of plural control positions enabling selection of individual ones of plural electrical control circuit configurations.

It is frequently desirable that electrical control circuits be readily and quickly converted from one control circuit configuration to one or more others enabling individual and often quite distinct characteristics of operational control. This may sometimes be accomplished by some form of relatively simple electrical circuit switching, but the more complex circuit conversions often require use of multiple switching control devices individually operable in various orders and combinations according to the particular desired one of plural circuit configurations available.

A typical example of one of these more complex forms of electrical circuit control arrangement requiring extensive yet readily available circuit conversion is disclosed in the copending application of Ben Harris et al. Ser. No. 254,896, filed January 30, 1963 for Data Transmission System, and assigned to the same assignee as the present application. The Harris et al. arrangement relates to a data transmission and collection system having plural available data sources, including a source of manually inserted data, which are used individually or in various combinations according to the nature of the data to be transmitted. This system has extensive application in many forms of business operations such as, for example, in manufacturing plants where machine operators must provide a continuing flow of information to a central location to inform that location of the current status of numerous types of machining, processing and fabrication operations. The data source or complement of data sources used for this purpose by one operator may be different from that used by another, yet by appropriate and readily effected change of electrical control circuit configuration the same available data sources may be employed by various categories of operators for transmission to the central location of various categories of data. Since these transmissions must be accomplished by persons of little skill or training in clerical methods and procedures, it is highly desirable that all required conversions of circuit control configuration be accomplished by operator settings of circuit control devices according to straightforward and clearly defined manipulative procedures.

It is an object of the present invention to provide, as expressed more clearly by the appended claims, a new and improved electrical circuit control device and arrangement which facilitates ready accomplishment of the foregoing enumerated desirable objectives.

Figure 2:
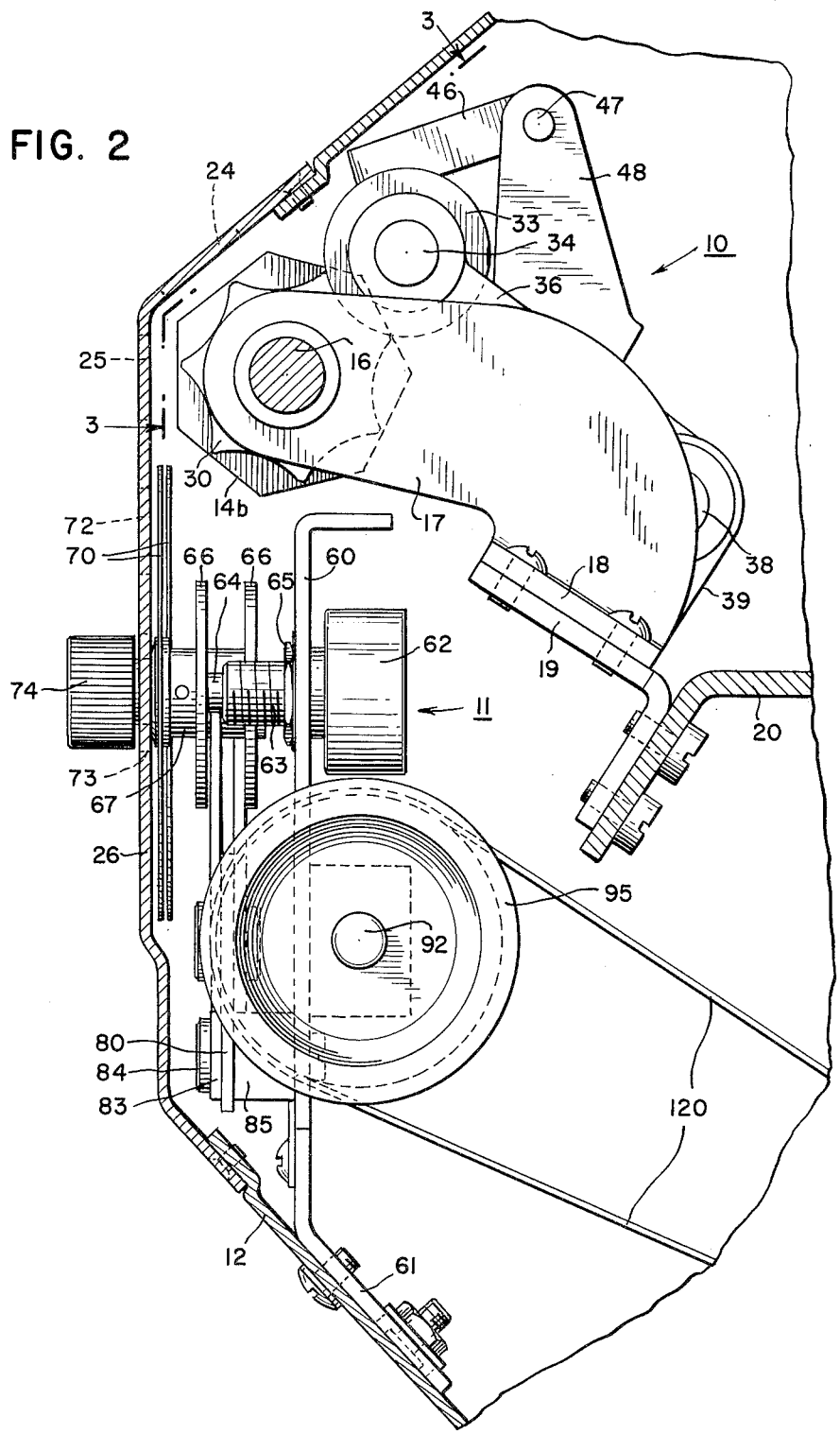
Figure 5:
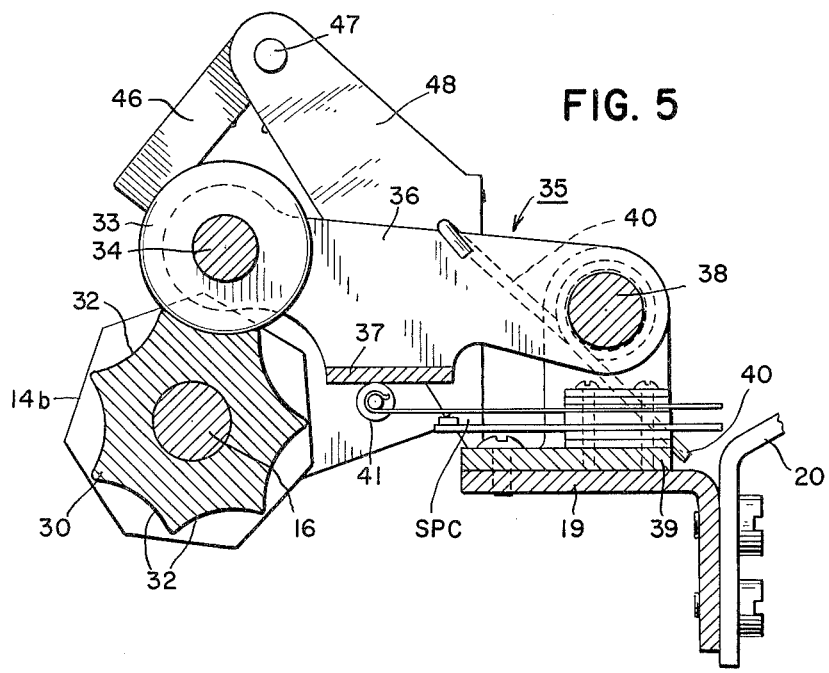
Figure 6:
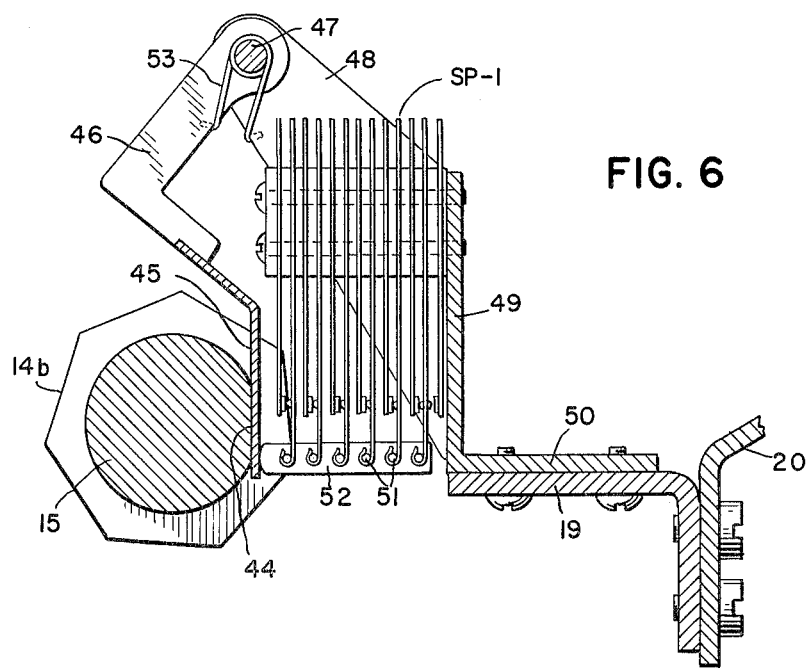

Referring to the drawings forming a part of this application, FIG. 1 illustrates in axonometric view two cooperating forms of electrical circuit control devices (hereinafter referred to for convenience as a program selector device and a manual data insertion device) enclosed within a horizontally positioned and outwardly projecting portion of an otherwise rectangular enclosing housing or cabinet of which only an upper corner portion is illustrated for simplicity; FIG. 2 is an elevational cross sectional view illustrating in greater particularity the relative arrangement of the circuit control devices within the enclosing cabinet; FIGS. 3 and 4 are respective front elevational and plan views illustrating the construction of the program selector device of FIGS. 1 and 2; and FIGS. 5 and 6 are cross-sectional views illustrating certain constructional details of the program selector device.

Referring more particularly to FIG. 1 of the drawings, two associated types of electrical circuit control devices 10 and 11 are illustrated as enclosed within a horizontally positioned and outwardly projecting portion 12 of a metal enclosing housing or cabinet 13 of which only an upper corner portion is shown for simplicity. The cabinet 13 conveniently encloses in addition various circuit components such as a manually operable start switch S1, a card eject switch S2, a void switch S5 and other components (not shown) of an electrical control system such as one form of data transmission system disclosed in the aforementioned Harris et al. copending application.

The construction of the electrical circuit control device 10, which as earlier mentioned will for convenience of reference be hereinafter referred to as a program selector device in conformity with the function which it performs in the aforementioned Harris et al. application, will be described by reference to FIGS. 1–6. It includes an elongated program drum 14 having by way of example three spaced, central, elongated, indicia portions 14a and shorter spaced pairs of end indicia portions 14b all of heptagon cross-sectional configuration. Intervening between the indicia bearing portions 14a and 14b of the program drum 14 are cam portions 15 each having a circular cross section except for a chord formed by a plane parallel to the drum axis and providing a peripheral cam surface. The drum 14 is journalled for axial rotation upon axially projecting end shafts 16 which are received in bearing surfaces in individual end arms 17 secured by flanged feet 18 to an elongated support member 19 of L-shaped cross section. The latter is supported at spaced points along its length on stationary brackets 20 suitably mounted within the cabinet 13 by means not shown for simplicity.

The right hand one of the shafts 16 as seen in the several figures extends through an aperture 22 in a side wall of the cabinet projecting portion 12, and has secured on its end a knob 23 which may be manually grasped to rotate the program drum 14 to any of seven angular positions corresponding to the seven sides of the drum indicia bearing portions 14a and 14b. As shown more clearly in FIG. 2, the drum is positioned at an upper corner of the cabinet projecting portion 12 having front and upper wall surfaces forming an obtuse angle corresponding to that between adjacent faces of the drum indicia portions 14a and 14b.

The central circumferential surface area of the center-most one of the elongated drum portions 14a carry words or other indica on each of its seven surfaces defining a particular one of seven programs which may be selected by manual rotation of the program drum 14 to each of its seven angular positions. The central circumferential surface areas of the end-most elongated drum portions 14a carry words or other indicia indicating certain operational procedures involved in the selected program. All of these centrally positioned words or indicia may be viewed through rectangular apertures 24 provided in the upper wall of the cabinet projecting portion 12. The end-most circumferential surface areas of the drum portions 14a and the surface areas of the drum portions 14b carry words of instruction or other indicia concerning the manual settings of the electrical circuit control device 11 in conformity with the selected program. These words or indicia may be viewed through rectangular apertures 25 provided in the front wall of the cabinet projecting portion 12. All of these words or indicia are conveniently printed on pressure-sensitive-adhesive coated paper tabs placed on the flat surfaces of the drum portions 14a and 14b, and the cabinet projecting portion 12 is provided with a removable front panel 26 to permit ready change of the tabs from time to time as desired.

The program drum is retained in each of the seven angular positions to which it may be manually rotated by a detent structure shown in FIG. 5. This structure includes a detent member 30 having a collar 31 (FIG. 3) by which the member is pinned on the right hand shaft 16. The detent member 30 has a peripheral surface formed of star-wheel cross-sectional sonfiuration with seven equally spaced axially extending cylindrical surface depressions 32. The latter are engaged by a cylindrical detent roller 33 rotatably supported on a shaft 34 secured in aligned apertures provided at one end of a U-shaped detent arm member 35 having parallel side arms 36 joined by an integral bridge section 37. The detent arm member 35 is pivotally supported on a shaft 38 extending between the upturned arms of a U-shaped support member 39 secured on the elongated support member 19, and is biased by a helical wire spring 40 to engage the detent roller 33 with a depression 32 of the detent member 30. The detent member 30 is secured in such angular position on the shaft 16 that, as illustrated in FIG. 2, two adjacent surfaces of the program drum portions 14a and 14b are parallel to the top and front surfaces adjoining the upper corner bend of the front panel 26 for each of the seven angular positions to which the program drum may be manually set. Manual rotation of the shaft 16 to rotate the program drum from one of its angular positions to another causes the detent roller 33 to ride up and over the ridge between the depressions 32 of the detent member 30 with resultant angular oscillation of the detent arm member 35. An electrical contact assembly SPC is secured to the support member 39 and has an elongated movable contact terminating in a roller 41 which engages the bridge section 37 of the detent arm member 35 and operates the movable contact between contact-closed and contact-open positions upon each angular oscillation of the detent arm 35. The electrical contact assembly SPC may accordingly be used to provide an electrical indication of each change of rotational positioning of the program drum 14.

Each of the cam portions 15 of the program drum 14 is associated with a cam-follower electrical-contact actuating structure illustrated in FIG. 6. Each cam portion 15 provides a cylindrical surface concentric with the drum axis except for an axially parallel planar surface portion 44. The surface of the cam portion 15 is engaged by an elongated flat cam follower member 45, the upper end of which forms an integral bridge between two parallel L-shaped supporting arms 46. The upper ends of the latter have aligned apertures for pivotal mounting upon a shaft 47 supported between parallel support arms 48 formed as upstanding projections of a support member 49 having a flanged foot 50 by which the member 49 is secured to the elongated support member 19. Two electrical contact stacks, which for the right-most program drum cam portion 15 are identified as SP-1, are mounted in side by side relation on the support member 49 and have elongated movable contacts anchored at their ends on studs 51 provided on a common contact actuating bridge member 52 of electrical insulating material. The resilient bias force of the movable contacts bias the bridge member 52 into continuous engagement with the cam follower member 45, and the latter is biased into engagement with the surface of the drum cam portion 15 by a helical wire spring 53. It will be evident that the drum cam portion 15 provides a cam surface which operates through the cam follower 45 to maintain pairs of electrical contacts of the contact stack in open-circuit position, and each set of transfer contacts in non-transfer position, for all of the seven rotational positions of the program drum 14 except one. In this one position of the program drum 14, the planar surface 44 of the drum cam portion 15 permits the cam follower member 45 to pivot clockwise (as seen in FIG. 6) about the shaft 47 under bias of the spring 53 to permit contact pairs to move to closed-contact position and to permit transfer contact sets to move to transfer position.

As shown more clearly in FIGS. 3 and 4, there are seven pairs of electrical contact stacks SP-1–SP-7 associated with the seven cam portions 15 of the program drum 14. By forming the planar surface portion 44 of each drum cam portion 15 at an angular position such that its surface portion 44 is engated by the associated cam follower member 45 when the program drum is in an individual one of its seven angular rotational positions, each position of the program drum will effect actuation of an individual pair of electrical contact stacks. Each pair of these contact stacks thus is enabled to provide a large number of electrical circuit changes so that the seven rotational positions of the program drum enable rapid and easily effected selection of seven different configurations or basic modifications of an electrical control circuit with which the present electrical circuit control device is used.

The resettable electrical circuit control device 11 shown in FIGS. 1 and 2 and which as previously mentioned is for convenience of reference referred to as a manual data insertion device in conformity with the function which it performs in the aforementioned Harris et al. application, is supported on a panel 60, 61 and includes a plurality of rotary electrical switches 62 each having a threaded sleeve 63 journalling a shaft 64 and secured by a nut 65 to the panel 60. A plurality of reset cams 66 are secured on individual ones of the switch shafts 64 by integral hubs 67 which also support dials 70, viewed through apertures 72 of the panel 26, which indicate the switch position as manually rotationally adjusted by knobs 74 secured upon the ends of the shafts 64. The foregoing briefly indicated components of the manual data insertion device 11, and an associated power driven reset structure including structural elements illustrated and identified by the reference numerals 80, 83–85, 92, 95 and 120, are more fully disclosed and claimed in a copending application of Warren T. VanBuskirk, Serial No. 254,991, filed January 30, 1963, entitled "Resettable Control Device Having Elements Reset by Use of Heart-Shaped Cams," and assigned to the same assignee as the present application.

The individual operations of the program selector device 10 and manual data insertion device 11 and their cooperative relationship will now be considered. Assume in this regard that the program drum 14 of the program selector device 10 is manually rotated to one of its seven positions, and that in this position the drum is provided with printed words of the character illustrated by way of example in FIG. 3. Assume further that the present structures are utilized in a data transmission system of the type shown in the above-mentioned Harris et al. application, and particularly that a factory machine operator is to make a data transmission concerning a machine boring operation performed by him and that the transmission utilizes a badge reader which reads a personnel identification badge identifying the operator performing the transmission, reads a tabulating card which records data identifying the parts upon which the boring operation was performed, and requires manual insertion of data by the operator.

In preparation for the transmission, the operator would select the program illustrated in FIG. 3 by manual manipulation of the knob 23 (FIG. 1) to rotate the program drum 14 until the word "BORE" appears in the central one of the cabinet apertures or windows 24. The abbreviation "BGE" of the word badge would thereupon appear in the left hand one of the apertures or windows 24 to inform the operator that the transmission will require operation of a badge reader and accordingly that he should insert his identification badge in this reader. The word "CARD" would appear in the right hand one of the apertures or windows 24 to inform the operator that the transmission will require operation of a tabulating card reader and accordingly that he should insert an appropriate tabulating card in this reader. There would also appear in the left-most four of the apertures or windows 25 the words "MOVE TO," thereby to inform the operator that he should manually manipulate the four knobs 74 immediately below these windows manually to insert four numeric data digits indicating the number of the department or station to which his partially fabricated parts were to be next transferred for the next fabrication operation. In the fifth to eighth aperture or window 25 from the left, there would appear the word "PIECES" to indicate to the operator that he should manipulate the four knobs 74 below these windows and insert four numeric data digits indicating the total number of parts upon which his boring operation had been performed. In the ninth and tenth apertures 25 from the left, there would appear the respective words "NO. REJ,CT." and "NO. SCRAP" to inform the operator that he should manipulate the knobs 74 immediately below these windows to insert numeric data digits indicating the number of parts which were respectively rejected and scrapped resulting from supervisory inspection upon completion of his operations.

The selection of a program drum position in the manner just explained effects operation of an individual pair of electrical contact stacks SP–1–SP–7 (FIGS. 3–5). These accomplish such conversion of configuration of the associated electrical transmission control circuit as to effect automatic sequential initiations of operation of the badge and tabulating card readers and appropriate preliminary checks to insure correct settings of the manual data insertion device 11, the latter likewise accomplishing conversions of configuration of the control circuit complementing those effected by the program selector device 10. Transmissions are then initiated upon operator actuation of the start switch S1 as more fully disclosed and explained in the aforementioned Harris et al. application.

It will be apparent from the foregoing description of the program selector device 10 and manual data insertion device 11 that these electrical circuit control devices enable multiple control circuit conversions of complex nature to be accomplished rapidly and easily even by persons having little technical skill or training.

While a specific form of the invention has been described for purposes of illustration, it is contemplated that numerous changes may be made without departing from the spirit of the invention.

What is claimed is:

1. An electrical circuit control device comprising an elongated control member journalled for axial rotation to preselected angular positions each providing longitudinally spaced indicia areas on the peripheral surface of said member, detent means for detaining said control member in each of said angular positions thereof, a circumferential cam surface positioned at each of plural longitudinally spaced positions along said member and each having at least one arcuate cam lobe bearing a predetermined angular displacement relative to one of said control member angular positions individual to said each cam surface, a plurality of electrical contacts, a plurality of cam follower means individual to and engaging said cam surfaces for operating individual groups of said electrical contacts between contact-open and contact-closed positions thereof, and an opaque panel supported in fixedly spaced relation to said member and having at least one row of transparent windows positioned in opposing relation to said indicia areas of said member.

2. An electrical circuit control device comprising an elongated control member of polyhedron cross-sectional configuration in selected regions thereof and journalled for axial rotation to preselected angular positions each providing longitudinally spaced planar indicia areas on the peripheral surface of said member, detent means for detaining said control member in each of said angular positions thereof, a circumferential cam surface formed on individual ones of plural longitudinally spaced lengths of said control member and each having at least one arcuate cam lobe bearing a predetermined angular displacement relative to one of said control member angular positions individual to said each cam surface, a plurality of electrical contacts, a plurality of cam follower means individual to and engaging said cam surfaces for operating individual groups of said electrical contacts between contact-open and contact-closed positions thereof, and an opaque panel having an obtuse corner bend with adjacent wall surfaces fixedly supported in closely-spaced parallel relation to adjacent faces of said member and providing on either side of said bend rows of spaced window apertures defining for each thereof an individual indicia peripheral surface on said member.

3. An electrical control device comprising a plurality of electrical contact assemblies displaced along a linear axis and each including contacts relatively movable between contact-closed and contact-open states, an elongated member rotationally movable about a longitudinal axis and having plural axially aligned indicia areas visually indicative of preselected angular rotational positions thereof and longitudinally displaced concentric cam surfaces providing arcuate segmental portions defining for each cam surface an individual one of said rotational positions of said member, a plurality of cam followers supported to engage individual ones of said cam surfaces and to actuate individual ones of said contact assemblies by relative cam-controlled movement of the contacts thereof, and detent means for detaining said member in each of said positions thereof.

4. An electrical control device comprising a plurality of electrical contact assemblies displaced along a linear axis and each including contacts relatively movable between contact-closed and contact-open states, an elongated member of polyhedron cross-sectional configuration in selected regions thereof and axially journalled for rotational movement about an axis parallel to said first mentioned axis and to angular positions corresponding in number to the planar sides thereof, whereby the planar sides of said member provide axially elongated angular-position indicating areas, a plurality of axially displaced and axially concentric cam surfaces carried by said member and including on each thereof a flat segmental cam portion defining for each cam surface an individual one of said angular positions of said member, a plurality of cam followers supported to engage individual ones of said cam surfaces and to actuate individual ones of said contact assemblies by relative cam-controlled movement of the contacts thereof, and detent means for detaining said member in each of said positions thereof.

5. An electrical control device comprising a plurality of electrical contact assemblies displaced along a linear axis and each including contacts relatively movable between contact-closed and contact-open states, an elongated member of polyhedron cross-sectional configuration in selected regions thereof and axially journalled for rotational movement about an axis parallel to said first mentioned axis and to angular positions corresponding in number to the planar sides thereof, whereby the planar sides of said member provide axially elongated angular-position indicating areas, a plurality of axially displaced and axially concentric cam surfaces integrally formed on said member with flat cam-surface segments defining for each cam surface an individual one of said angular positions of said member, a plurality of cam followers supported to engage individual ones of said cam surfaces and to actuate individual ones of said contact assemblies by relative cam-controlled movement of the contacts thereof, and detent means for detaining said member in each of said positions thereof.

6. An electrical control device comprising a plurality of electrical contact assemblies displaced along a linear axis and each including contacts relatively movable between contact-closed and contact-open states, an elongated member of polyhedron cross-sectional configuration in selected regions thereof and axially journalled for rotational movement about an axis parallel to said first mentioned axis and to angular positions corresponding in number to the planar sides thereof, whereby the planar sides of said member provide axial elongated angular-position indicating areas, a plurality of axially displaced and axially concentric cam surfaces carried by said member and including on each thereof a flat segmental cam portion defining for each cam surface an individual one of said angular positions of said member, a plurality of cam followers supported to engage individual ones of said cam surfaces and to actuate individual ones of said contact assemblies by relative cam-controlled movement of the contacts thereof, detent means for detaining said member n each of said positions thereof, and an opaque panel having an obtuse corner bend with adjacent wall surfaces fixedly supported in closely-spaced parallel relation to adjacent faces of said member and providing on each side of said bend rows of spaced window apertures defining for each thereof an individual indicia peripheral surface on said member.

References Cited by the Examiner
UNITED STATES PATENTS

| | | | |
|---|---|---|---|
| 2,669,615 | 2/1954 | Cox | 200—153 |
| 2,969,441 | 1/1961 | Showalter. | |

References Cited by the Applicant
UNITED STATES PATENTS

| | | |
|---|---|---|
| 2,574,687 | 11/1951 | Bullard. |
| 2,612,710 | 10/1952 | Fuller. |

KATHLEEN H. CLAFFY, *Primary Examiner.*

ROBERT K. SCHAEFER, BERNARD A. GILHEANY,
*Examiners.*